US010923970B2

(12) United States Patent
Katsura et al.

(10) Patent No.: US 10,923,970 B2
(45) Date of Patent: Feb. 16, 2021

(54) ROTARY ELECTRIC MACHINE HAVING MAGNETIC FLUX SUPPLIED FROM A FIELD COIL

(71) Applicant: EXEDY CORPORATION, Neyagawa (JP)

(72) Inventors: Hitoshi Katsura, Neyagawa (JP); Taichi Kitamura, Neyagawa (JP); Kimitaka Uemura, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 32 days.

(21) Appl. No.: 16/408,892

(22) Filed: May 10, 2019

(65) Prior Publication Data

US 2019/0372407 A1 Dec. 5, 2019

(30) Foreign Application Priority Data

May 31, 2018 (JP) .................. 2018-105415

(51) Int. Cl.
*H02K 1/12* (2006.01)
*F02N 11/04* (2006.01)
(Continued)

(52) U.S. Cl.
CPC .............. *H02K 1/12* (2013.01); *F02N 11/04* (2013.01); *F02N 15/006* (2013.01); *H02K 1/24* (2013.01);
(Continued)

(58) Field of Classification Search
CPC ......... H02K 1/22; H02K 1/226; H02K 21/00; H02K 21/02024; H02K 21/046; H02K 21/048; F02N 11/04
(Continued)

(56) References Cited

U.S. PATENT DOCUMENTS 5,929,541 A 7/1999 Naito et al.
8,330,319 B2 * 12/2012 Hsu .................. H02K 1/246
310/216.129
(Continued)

FOREIGN PATENT DOCUMENTS

JP 3445492 B2 9/2003
JP 2010-516558 A 5/2010

OTHER PUBLICATIONS

Extended European Search Report dated Nov. 4, 2019 for the corresponding European Patent Application No. 19177038.7, 7 pp.

*Primary Examiner* — Tulsidas C Patel
*Assistant Examiner* — Rashad H Johnson
(74) *Attorney, Agent, or Firm* — United IP Counselors, LLC (57) ABSTRACT

A brushless winding field type rotary electric machine between a starting device and a stationary case, having a stator held in the case and internally equipped with an AC coil generating a rotating magnetic field by an AC current; a field core held in the case and internally equipped with a field coil excited by a DC current; a rotor disposed around the starting device outer periphery and rotatable with respect to the stator and the field coil; a first air gap formed between the stator and the rotor, delivering a magnetic flux between the two; a second air gap formed between the field core and the rotor, delivering a magnetic flux between the two. The second air gap has an inclined section inclined with respect to a rotation shaft axial direction so that the rotor radially outer portion is positioned on the radially outer side than the field core.

11 Claims, 10 Drawing Sheets

(51) Int. Cl.
  *F02N 15/00*   (2006.01)
  *H02K 1/24*    (2006.01)
  *H02K 3/12*    (2006.01)
  *H02K 5/173*   (2006.01)
  *H02K 21/14*   (2006.01)

(52) U.S. Cl.
  CPC ............... *H02K 3/12* (2013.01); *H02K 5/173* (2013.01); *H02K 21/14* (2013.01)

(58) Field of Classification Search
  USPC .......... 310/24, 33, 66, 67 A, 154.27, 156.66, 310/156.67, 216.025, 216.031, 216.038, 310/216.039, 216.074, 216.075, 216.087
  See application file for complete search history.

(56)               References Cited

U.S. PATENT DOCUMENTS

| | | | |
|---|---|---|---|
| 9,083,225 B2* | 7/2015 | Tonogi | H02K 19/103 |
| 2002/0047433 A1 | 4/2002 | Sekiyama et al. | |
| 2003/0178909 A1* | 9/2003 | Kusase | H02K 21/044 |
| | | | 310/254.1 |
| 2004/0232794 A1* | 11/2004 | Hsu | H02K 21/046 |
| | | | 310/156.56 |
| 2005/0258699 A1* | 11/2005 | Hsu | H02K 21/046 |
| | | | 310/156.56 |
| 2009/0283344 A1 | 11/2009 | Arnold et al. | |
| 2019/0334401 A1* | 10/2019 | Katsura | H02K 19/26 |
| 2019/0334421 A1* | 10/2019 | Katsura | H02K 19/24 |
| 2019/0334423 A1* | 10/2019 | Katsura | H02K 19/26 |

\* cited by examiner

ROTARY ELECTRIC MACHINE HAVING MAGNETIC FLUX SUPPLIED FROM A FIELD COIL

BACKGROUND OF THE INVENTION

Technical Field

The present invention relates to a brushless winding field type rotary electric machine disposed around the outer periphery of a rotary member.

Background Art

Figure 8:
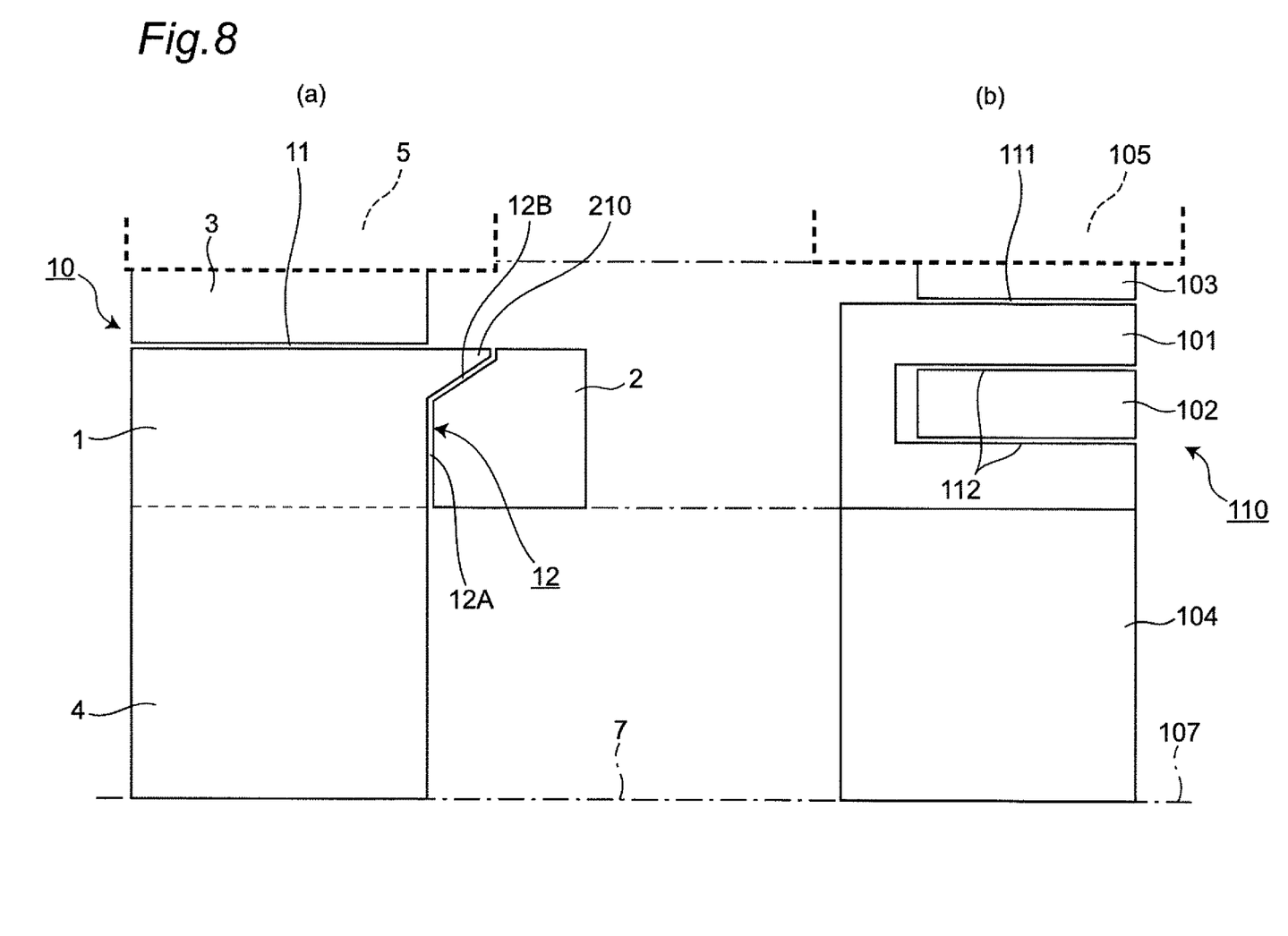
FIG. 8 is a comparative view of (a) and (b) showing the comparison between a member arrangement configuration according to the first embodiment and a member arrangement configuration according to the conventional example.

As shown in (b) of FIG. 8 showing a conventional example (refer to Patent Document 1), a rotary electric machine for supplying a magnetic flux from a field coil 102 that is stationary with respect to a rotor 101 is proposed. A stator 103 is disposed on the radial outside of a rotor 101. With this structure, a power supply device required for magnetizing the rotor 101, that is, a slip ring using the so-called brushes, can be abolished. This type of rotary electric machine is a brushless winding field type rotary electric machine 110. A first air gap 111 is provided between the stator 103 and the rotor 101, and a second air gap 112 is provided between a field coil 102 and the rotor 101. Both the air gaps extend along the axial direction of a rotation shaft 107.

Furthermore, Patent Document 2 proposes a structure in which a rotary electric machine is disposed around the outer periphery of a starting device. The rotary electric machine having this structure is connected to an engine, whereby the rotary electric machine can start the engine and can function as a generator during vehicle traveling. Consequently, the starter and the alternator required for conventional vehicles can be abolished.

PRIOR ART REFERENCE

Patent Documents

[Patent Document 1] JP 3445492 B1
[Patent Document 2] JP 2010-516558 T

SUMMARY OF THE INVENTION

Problem to be Solved by the Invention

In the case that an attempt is made to dispose the brushless winding field type rotary electric machine 110 around the outer periphery of a starting device 104 as shown in (b) of FIG. 8 by combining the structures disclosed in these two Patent Documents, in the combination of the structures disclosed in the two Patent Documents, the three members, i.e., the stator 103 to be fixed to a stationary case 105, the rotor 101, and the field coil 102 are disposed coaxially and on different diameters with the rotation shaft 107 in a narrow space between the inner peripheral side of the stationary case 105 and the outer peripheral side of the starting device 104. Hence, there is a strict restriction on the volume to be occupied by the rotary electric machine 110, whereby there are problems that the degree of freedom in design is limited and the output performance of the rotary electric machine 110 is limited.

An object of the present invention is thus to provide a rotary electric machine capable of enhancing the degree of freedom in design and improving the output performance of the rotary electric machine by solving the above-mentioned problems.

Means for Solving the Problem

The present invention features a brushless winding field type rotary electric machine positioned between a rotary member and a stationary case, being equipped with:
  a stator held in the stationary case and internally equipped with an AC coil for generating a rotating magnetic field by an AC current,
  a field core held in the stationary case and internally equipped with a field coil excited by a DC current,
  a rotor disposed around the outer periphery of the rotary member and held so as to be rotatable with respect to the stator and the field coil,
  a first air gap formed between the stator and the rotor, thereby delivering a magnetic flux between the stator and the rotor, and
  a second air gap formed between the field core and the rotor, thereby delivering a magnetic flux between the field coil and the rotor, wherein
  the field coil of the field core is disposed in parallel with the rotor in the axial direction of the rotation shaft of the rotary member via the second air gap, and
  the second air gap has an inclined section inclined with respect to the axial direction of the rotation shaft between the field core and at least the radially outside portion of the portion on the field core side of the rotor so that the radially outer portion of the rotor is positioned on the radially outer side than the field core.

Effect of the Invention

With the present invention, the following effects can be exerted.
  (a) Since the rotor and only either one of the stator and the field coil are disposed in a narrow space between the inner peripheral side of the stationary case and the outer peripheral side of the rotary member, the two members may merely be disposed coaxially and on different diameters with the rotation shaft. Consequently, the degree of freedom in design is enhanced and the output performance of the rotary electric machine can be improved.
  (b) Since the second air gap has the inclined section, the efficiency of the rotary electric machine can be improved, and an axial force can be reduced.
  (c) Since the radially outside portion on the field core side of the rotor is positioned on the radially outer side than the field core by virtue of the inclined section of the second air gap, the portion on the field core side of the rotor can be prevented from being expanded in diameter by a centrifugal force and from interfering with the field core.

DETAILED DESCRIPTION

Embodiments of the present invention will be described below in detail referring to the accompanying drawings.

First Embodiment

Figure 1:
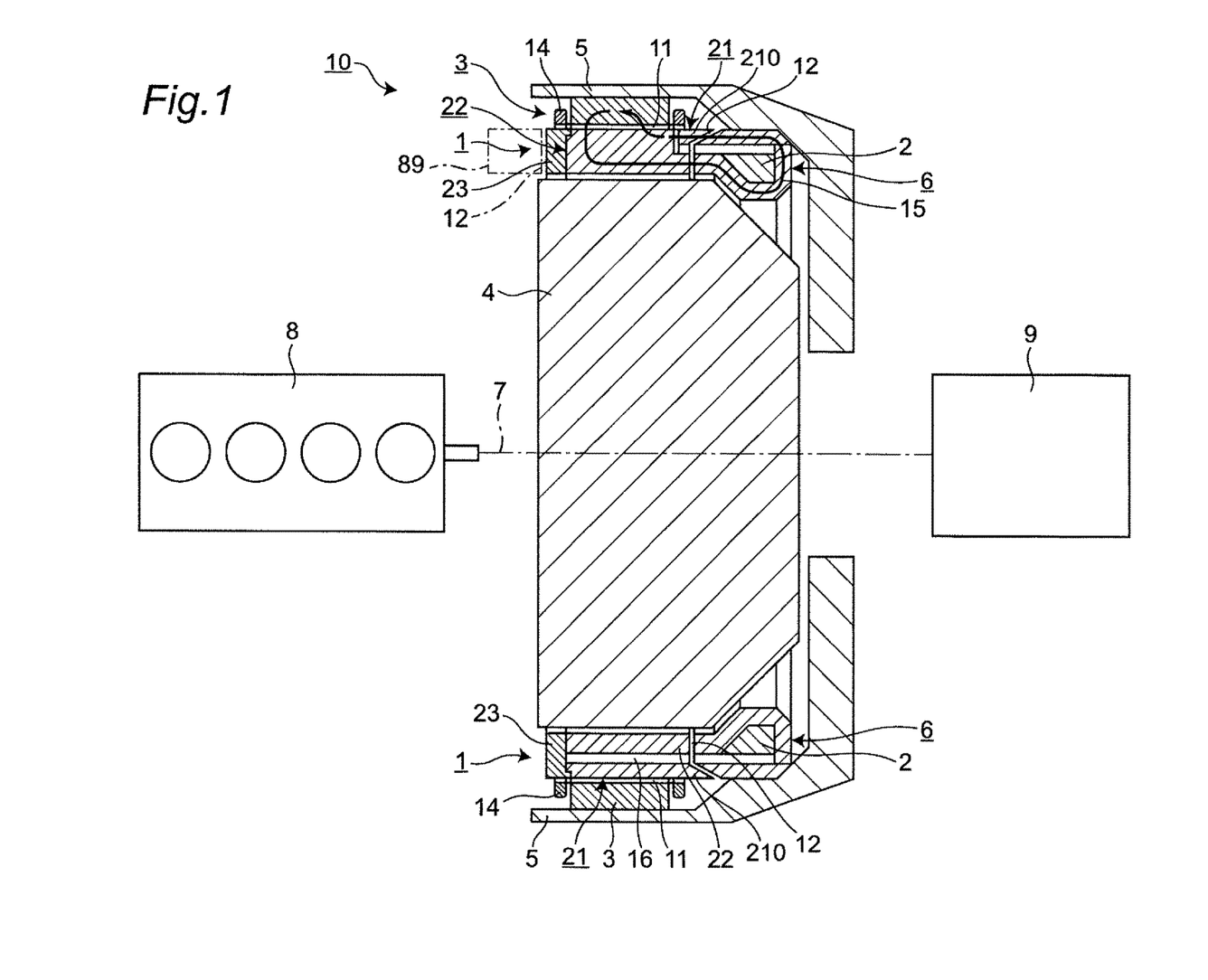
FIG. 1 is a view showing a vertical cross section of a rotary electric machine according to a first embodiment of the present invention and also showing the arrangement relationship among the rotary electric machine, an engine and a transmission.
Figure 2:
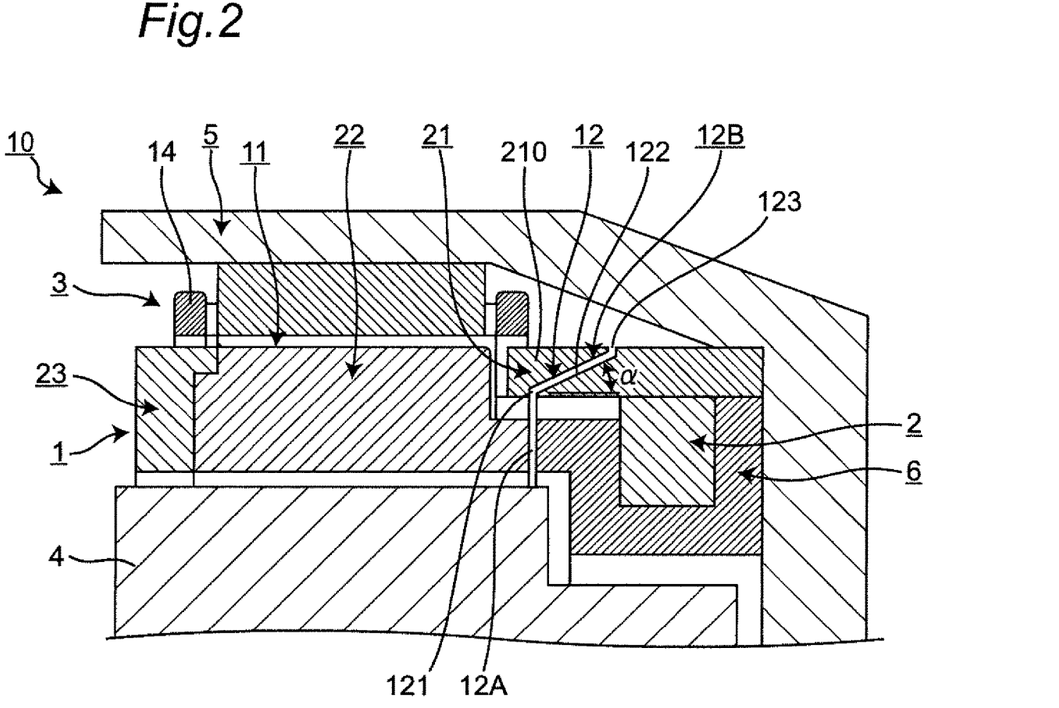
FIG. 2 is a vertically sectional enlarged partial view showing the rotary electric machine shown in FIG. 1.
Figure 3:
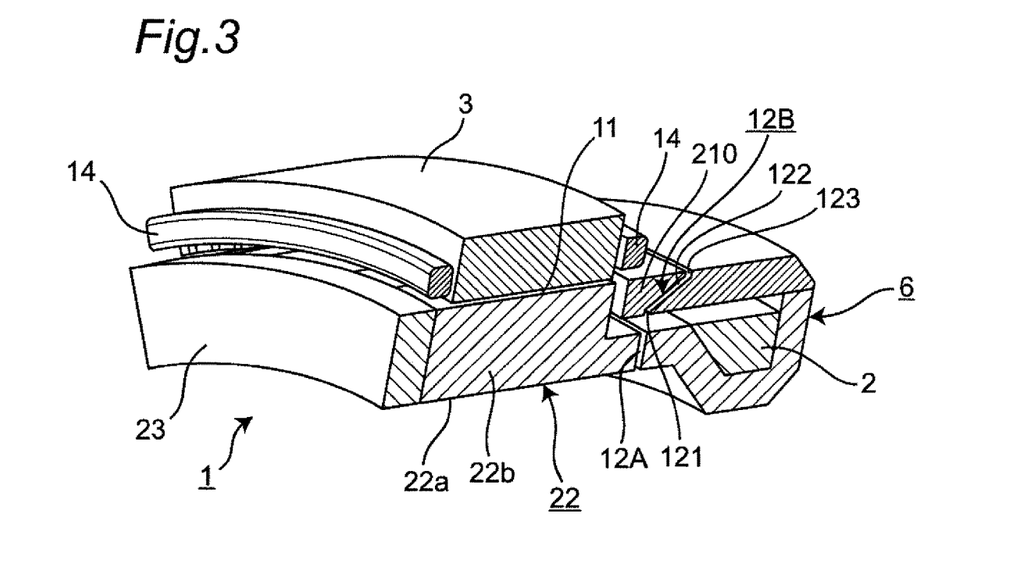
FIG. 3 is a vertically sectional perspective partial view showing the rotary electric machine shown in FIG. 1.
Figure 4:
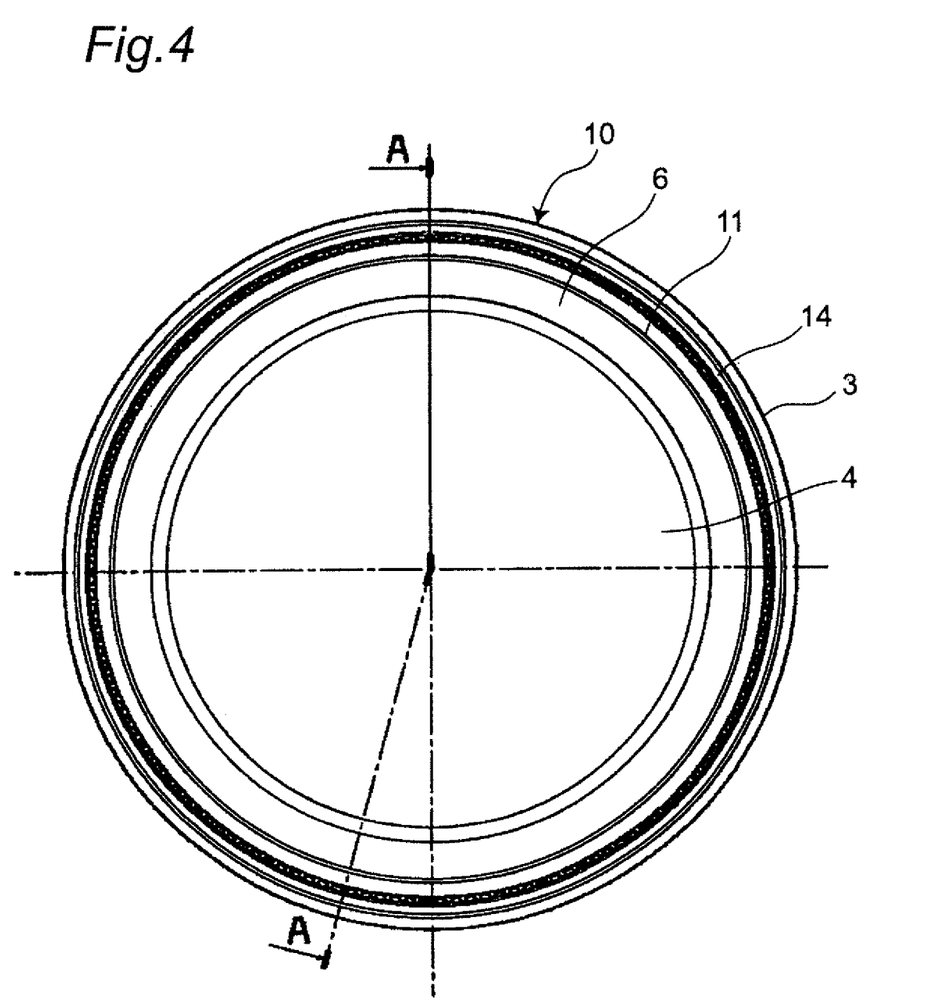
FIG. 4 is a front view showing the rotary electric machine according to the first embodiment, as viewed from the transmission side.
Figure 5:
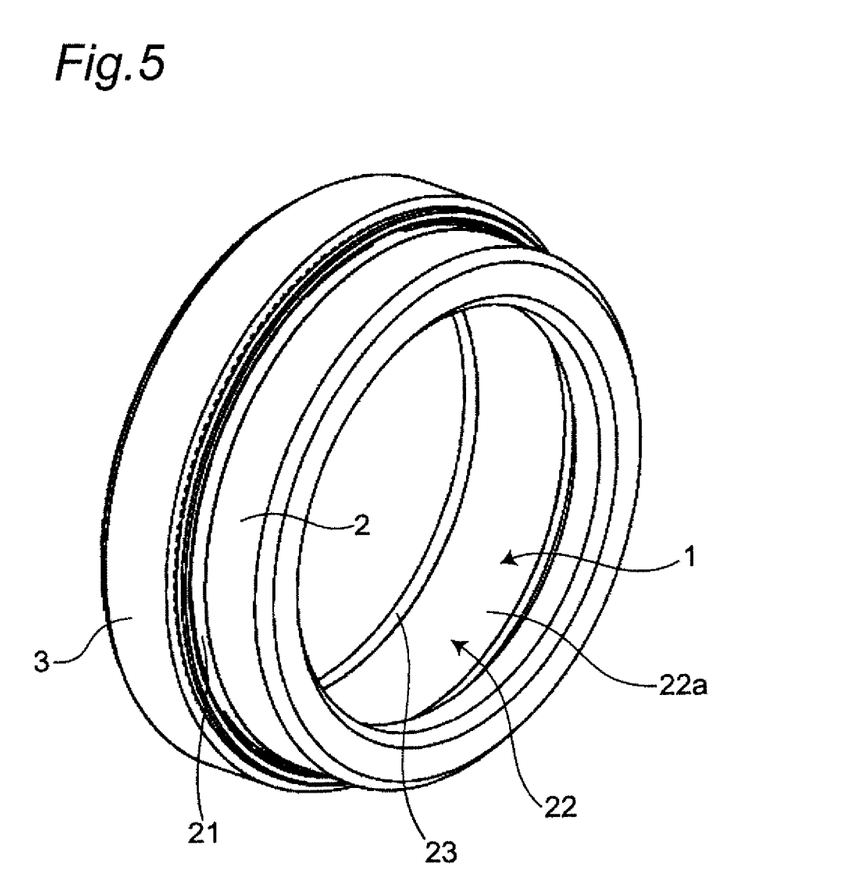
FIG. 5 is a perspective view showing the rotary electric machine according to the first embodiment.

As shown in FIGS. 1 to 3, the rotary electric machine according to this embodiment is a brushless winding field type rotary electric machine 10 that is disposed between an engine 8 and a transmission 9 along a rotation shaft 7 and positioned between a stationary case 5 containing a starting device 4 and the starting device 4. This rotary electric machine 10 is equipped with at least a stator 3, a field coil 2 and a rotor 1.

The stator 3 is unrotatably fixed to and held in the stationary case 5, is constituted of a cylindrical member having a plurality of slots in which an AC coil 14 is wound, is provided with the AC coil 14 inside, and generates a rotating magnetic field by the AC current flowing in the AC coil 14.

The field coil 2 is disposed while being shifted from the stator 3 and the rotor 1 along the rotation shaft 7, is fixed to and held in the stationary case 5 on the transmission 9 side of the stator 3, and is excited by a DC current. A field core 6 has the field coil 2 inside. However, the field coil 2 may be disposed while being shifted from the stator 3 and the rotor 1 along the rotation shaft 7 to the engine 8 side of the stator 3 via a second air gap 12, instead of the transmission 9 side of the stator 3, as shown in the region 89 indicated by a dashed line in FIG. 1.

The rotor 1 is disposed so as to be fixed to the outer periphery of the starting device 4. The outer peripheral face of the rotor 1 is opposed to the inner peripheral face of the stator 3, and the end face on the transmission 9 side of the rotor 1 is opposed to the end face on the engine 8 side of the field coil 2. The rotor 1 is held so as to be rotatable with respect to the stator 3 and the field coil 2 around the rotation shaft 7.

A first air gap 11 is formed between the stator 3 and the rotor 1, thereby delivering a magnetic flux between the stator 3 and the rotor 1. The first air gap 11 is a gap extending along the axial direction of the rotation shaft 7 between the inner peripheral face of the stator 3 and the outer peripheral face of the rotor 1.

The second air gap 12 is formed between the field core 6 and the rotor 1, thereby delivering the magnetic flux between the field coil 2 and the rotor 1. More specifically, the second air gap 12 has an air gap 12A formed between the field core 6 and the second magnet pole 22 of the rotor 1 and an air gap 12B formed between the field core 6 and the first magnetic pole 21 of the rotor 1. In other words, the air gap 12A is formed between the field core 6 and the radially inner portion of the portion on the field core 6 side of the rotor 1. The air gap 12B is formed between the field core 6 and the radially outer portion 210 of the portion on the field core 6 side of the rotor 1. The air gap 12A is formed so as to be perpendicular to the axial direction of the rotation shaft 7. The air gap 12B is formed so as to be inclined with respect to the axial direction of the rotation shaft 7. More specifically, the air gap 12B is composed of a first vertical section 121 being perpendicular to the axial direction of the rotation shaft 7, an inclined section 122 inclined at an inclination angle α with respect to the axial direction of the rotation shaft 7, and a second vertical section 123 being perpendicular to the axial direction of the rotation shaft 7. The first vertical section 121, the inclined section 122 and the second vertical section 123 are formed so as to be continuous. Furthermore, the inclined section 122 is inclined gradually from the side of the engine 8 to the side of the transmission 9 as the inclined section 122 extends from the inside to the outside in the radial direction. Hence, the radially outer portion 210 on the field core 6 side of the rotor 1 is positioned on the radially outer side than the field core 6. The inclination angle α is preferably in a range of 10 to 25 degrees. The gap widths of the first vertical section 121, the inclined section 122 and the second vertical section 123 are nearly the same.

Since the above-mentioned second air gap 12 is formed between the field core 6 and the rotor 1, the radially outside portion of the portion on the field core 6 side of the rotor 1 has a beak shape in a vertical cross section protruding toward the field core 6, and the portion on the rotor 1 side of the field core 6 has such a convex shape so as to get into the beak of the rotor 1.

On the other hand, as shown in FIGS. 4 to 7, the rotor 1 is configured by combining the first magnetic pole 21, the second magnet pole 22 and a magnetic pole holding member 23. The sectional view taken on the line A-A in FIG. 4 corresponds to a sectional view showing the rotary electric machine 10, the starting device 4, etc. shown at the center of FIG. 1.

Figure 7:
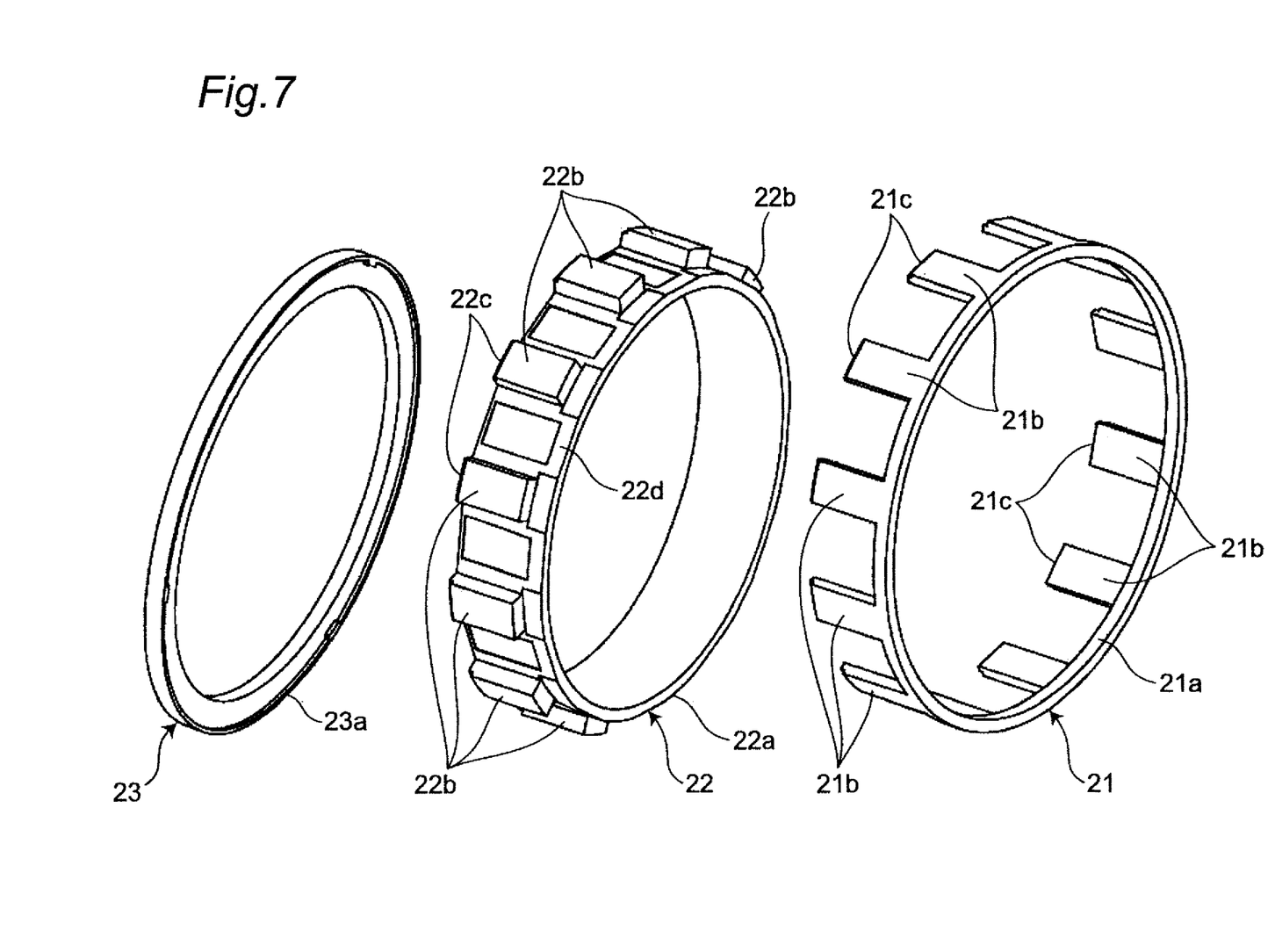
FIG. 7 is an exploded perspective view showing the rotor of the rotary electric machine according to the first embodiment.

The first magnetic pole 21 is made from a soft magnetic material, such as iron, and has a plurality of pawl sections 21b having, for example, a rectangular thin-plate shape, and protruding from a first annular section 21a in the axial direction of the rotation shaft 7. The pawl sections 21b are disposed at constant intervals, for example, at equal intervals, in the circumferential direction, and the lengths of all the pawl sections 21b in the axial direction of the rotation shaft 7 are the same. The outer peripheral faces of the respective pawl sections 21b are disposed along the outer peripheral face of the first annular section 21a. Even in the case that the first magnetic pole 21 is combined with the second magnet pole 22, the pawl sections 21b do not make contact with the second magnet pole 22, and a radial clearance 16 is formed in the radial direction.

Figure 6:
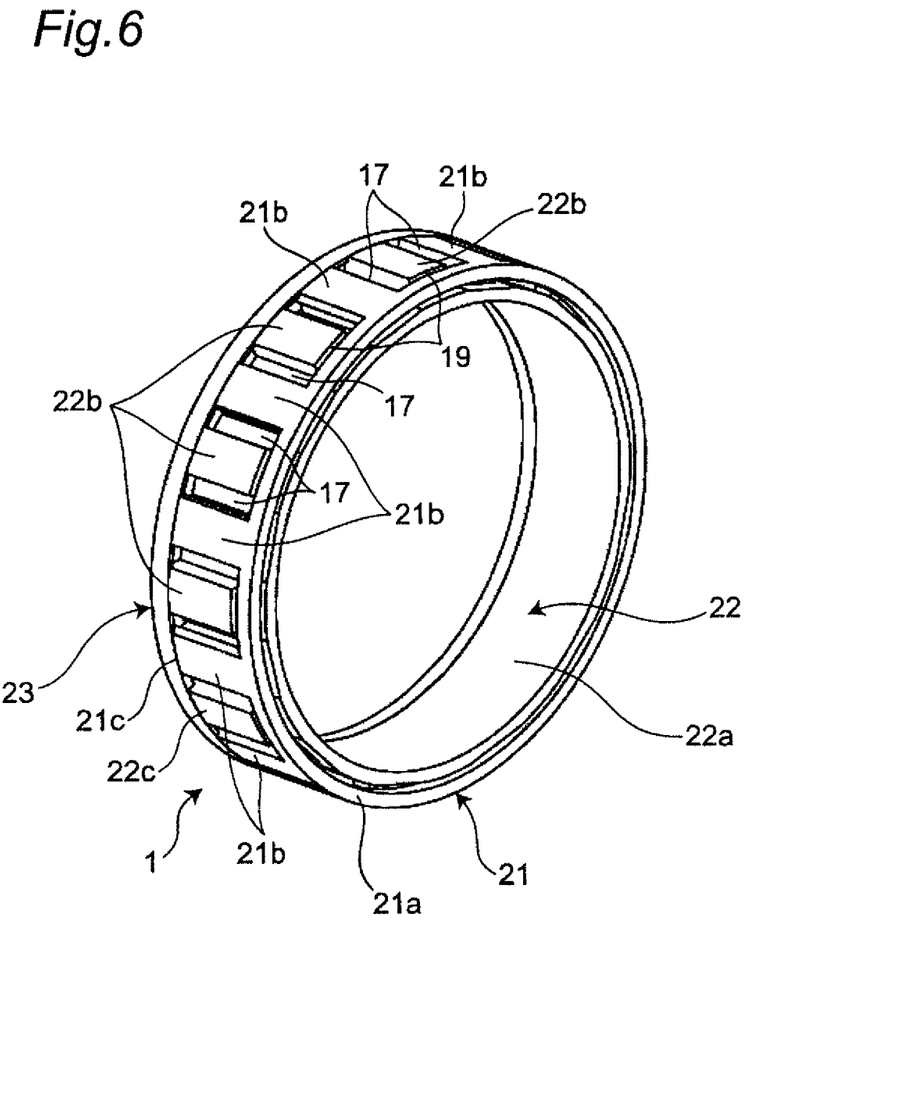
FIG. 6 is a perspective view showing the rotor of the rotary electric machine according to the first embodiment.

The second magnetic pole 22 is made from a soft magnetic material, such as iron, and is disposed so that the radial clearance 16 (FIG. 1) is provided on the inside of the first annular section 21a. The second magnetic pole 22 has a plurality of convex sections 22b having, for example, a rectangular plate shape, the convex sections radially protruding and being disposed while having circumferential clearances 17 in the circumferential direction on the outer peripheral face of a second annular section 22a that is disposed so as to be partially overlapped with the first annular section 21a. The convex sections 22b are also disposed at constant intervals, for example, at equal intervals, in the circumferential direction, and the radial heights of all the convex sections 22b are the same. The lengths of all the convex sections 22b in the axial direction of the rotation shaft 7 are the same and shorter than the length of the pawl section 21b. The outer peripheral faces of the respective convex sections 22b are disposed on a circle that has the same center as the center of the rotation axis of the rotor 1. Each convex section 22b extends to the edge on the engine 8 side of the second annular section 22a and is formed into a second tip end engagement section 22c. On the other hand, on the transmission 9 side of the second annular section 22a, each convex section 22b does not extend to the edge on the transmission 9 side of the second annular section 22a, and an annular fitting section 22d being narrow in width and not having the convex sections 22b is formed. The first magnetic pole 21 and the second magnet pole 22 are assembled by moving the first magnetic pole 21 to the second magnet pole 22 in the axial direction and by inserting each pawl section 21b of the first magnetic pole 21 into the intermediate section of the circumferential clearance 17 between the adjacent convex sections 22b so that the pawl sections 21b and the convex sections 22b are disposed alternately in the circumferential direction. At this time, the assembling is performed so that the first annular section 21a of the first magnetic pole 21 can be disposed on the outside of the fitting section 22d while the radial clearance 16 is provided therebetween. In the assembled state, as shown in FIG. 6, an axial clearance 19 is provided between each convex section 22b and the first annular section 21a, the circumferential clearance 17 is provided in the circumferential direction between each pawl section 21b and each convex section 22b of the second magnet pole 22, and the radial clearance 16 is also provided in the radial direction. Hence, the first magnetic pole 21 and the second magnet pole 22 are maintained in a noncontact state. The magnetic pole holding member 23 is further provided in order to fix the first magnetic pole 21 and the second magnet pole 22 in this state.

The magnetic pole holding member 23 is an annular member made from a nonmagnetic material, such as aluminum or austenitic stainless steel, and has a fitting section 23a into which the first tip end engagement sections 21c of the pawl sections 21b of the first magnetic pole 21 are fitted and fixed and the second tip end engagement sections 22c of the convex sections 22b of the second magnet pole 22 are fitted and fixed, for example, on the outer peripheral side. The first tip end engagement sections 21c and the second tip end engagement sections 22c are fitted into the fitting section 23a and then fixed, for example, by bolt fastening, shrink fitting or brazing, whereby the first magnetic pole 21 and the second magnet pole 22 are fixed and held by the magnetic pole holding member 23 in a noncontact state.

The first tip end engagement section 21c of the pawl section 21b of the first magnetic pole 21 and the second tip end engagement section 22c of the convex section 22b of the second magnet pole 22 are each, as a specific example, formed into a step section, and the step section is fitted into the engagement concave section of the fitting section 23a, thereby being held so as to be fixed in the radial direction. Although the second tip end engagement section 22c is disposed, as an example, at the tip end of the convex section 22b, the second tip end engagement section 22c may be disposed at the tip end of the second annular section 22a. With this configuration, when the first magnetic pole 21 and the second magnet pole 22 are magnetized by making a magnetic flux flow from the field coil 2, a magnetic flux short-circuit is prevented by the magnetic pole holding member 23 made from a nonmagnetic material, whereby efficient magnetization can be performed and the first magnetic pole 21 and the second magnet pole 22 can be held mechanically by the magnetic pole holding member 23. Moreover, since the first tip end engagement sections 21c of the pawl sections 21b of the first magnetic pole 21 are fitted and fixed to the fitting section 23a of the magnetic pole holding member 23, the expansion of the pawl sections 21b due to a rotational centrifugal force can be suppressed, whereby the rotational strength can be improved.

In the rotary electric machine 10 configured as described above, when the field coil 2 is energized, a field coil magnetic flux 15 is generated. The field coil magnetic flux 15 is formed by starting from the field core 6 and returning to the field core 6 via the second air gap 12 (the air gap 12B), the first magnetic pole 21 of the rotor 1, the first air gap 11, the stator 3, the first air gap 11, the second magnetic pole 22 of the rotor 1, and the second air gap 12 (the air gap 12A). At this time, for example, when a DC current is applied to the field coil 2, the field coil magnetic flux 15 is generated, whereby the first magnetic pole 21 and the second magnetic pole 22 are magnetized to, for example, an N pole and an S pole, respectively.

With the rotary electric machine 10 configured as described above, a case in which a starting function is performed by using the rotary electric machine 10 as a starter will be described first. On the basis of a command for starting the engine 8, the stator 3 is magnetized by driving an inverter, not shown, and by applying a three-phase AC current to the stator 3, and a DC current is applied to the field coil 2. The first magnetic pole 21 and the second magnetic pole 22 of the rotor 1 are excited by applying the current to the field coil 2. As a result, the rotor 1 starts rotating with respect to the stator 3, and an electromotive force having an induction voltage is generated in the stator 3.

After that, the induction voltage increases as the rotation speed of the rotor 1 increases. When the rotation speed reaches an initial-explosion rotation speed that is lower than the idling rotation speed corresponding to the idling of the engine 8 and the starting of the engine 8 is completed, the driving of the inverter is stopped. And then, the operation mode of the rotary electric machine 10 is automatically shifted to a power generation mode in which the rotary electric machine 10 operates as a generator to perform a power generation function so that the induction voltage is maintained at a predetermined induction voltage (required voltage).

In this power generation mode, when the field coil 2 continues to be excited, the exciting current is adjusted so that the induction voltage becomes constant at the predetermined induction voltage. The exciting current is adjusted so that the magnetization force of the rotor decreases as the rotation speed increases, thereby making the induction voltage constant. Furthermore, in the case that the field coil 2 is not excited, the lead angle of the three-phase AC current applied to the stator 3 is adjusted by the inverter so that the induction voltage becomes constant at the predetermined induction voltage. Moreover, the adjustment may be made by combining the above-mentioned two methods. With this control, when the rotor 1 is rotated, the rotary electric machine 10 functions as a generator.

As a result, the rotary electric machine 10 can start the engine and can function as a generator during vehicle traveling by connecting the rotary electric machine 10 to the engine 8.

Next, working effects exerted by this embodiment will be described.

(1) With this embodiment, since the field coil 2 is shifted with respect to the stator 3 and the rotor 1 in the axial direction of the rotation shaft 7 as shown in (a) of FIG. 8, the following effects can be exerted.

First, in the conventional example, as shown in (b) of FIG. 8, the rotary electric machine 110 is disposed on the radial outside of the starting device 104, and the three members, i.e., the stator 103, the rotor 101 and the field coil 102, are disposed in the space between the stationary case 105 and the starting device 104 inward from the outside in the radial direction. In this case, if the number of turns of the field coil 102 is increased to make the magnetic flux of the field coil larger, the radial thickness of the field coil becomes larger and the field coil cannot be inserted into the space, whereby the magnetic flux cannot be made larger.

On the other hand, in this embodiment, as shown in (a) of FIG. 8, the field coil 2 is disposed in parallel with the stator 3 and the rotor 1 while being shifted in the axial direction of the rotation shaft 7. With this configuration, only the two members, i.e., the stator 3 and the rotor 1, are provided on the radial outside of the starting device 4, whereby the disposition space for the field coil 2 is not required on the radial outside of the starting device 4. Therefore, the outer radial dimension of the starting device 4 becomes smaller by at least the amount of the disposition space for the field coil 2, or the thickness of the stator 3 or the rotor 1 can be increased by the amount of the disposition space, whereby the area around the outer periphery of the starting device 4 can be utilized effectively. Furthermore, since the field coil 2 is disposed at a position shifted from the stator 3 and the rotor 1 in the axial direction, the radial thickness of the field coil 2 can be increased and the magnetic flux of the field coil 2 can be made larger without considering the spaces for the stator 3 and the rotor 1. Consequently, the degree of freedom in design can be increased.

In addition, in such a radial disposition as shown in (b) of FIG. 8 showing the conventional example, the concentricity (the adjustment of concentric positions) between the rotor 101 on the rotation side and the field coil 102 on the stationary side is strict. However, in the case that the field coil 2 is shifted in the axial direction as shown in (b) of FIG. 8 showing this embodiment, the concentricity between the rotor 1 on the rotation side and the field coil 2 on the stationary side is not required to be adjusted so strictly as in the configuration shown in (b) of FIG. 8.

Furthermore, in the configuration shown in (a) of FIG. 8 showing this embodiment, since the field coil 2 can be disposed in the space either on the side of the engine 8 or on the side of the transmission 9 in the axial direction of the rotor 1, the space can be utilized effectively.

Moreover, in this embodiment, since the rotary electric machine 10 is disposed so that the rotor 1 of the rotary electric machine 10 is connected to the starting device 4 serving as a synchronous rotation member synchronously rotating with the output shaft (the rotation shaft) 7 of the engine 8 and so that the center axis of the output shaft of the engine 8 serves as the rotation axis of the rotor 1, the rotation drive force of the rotary electric machine 10 can be transmitted securely to the engine 8 even during a cold period, and the engine 8 can be started securely during the cold period.

Hence, with this embodiment, since the rotor 1 and only either one of the stator 3 and the field coil 2 are disposed in the narrow space between the inner peripheral side of the stationary case 5 and the outer peripheral side of the starting device 4, the two members may merely be disposed coaxially and on different diameters with the rotation shaft 7, whereby the degree of freedom in design is enhanced and the output performance of the rotary electric machine 10 can be improved.

(2) With this embodiment, since the second air gap 12 has the inclined section 122, the following effects can be exerted.

First, in the case that the second air gap 12 between the rotor 1 and the field coil 2 is formed so as to be perpendicular to the axial direction of the rotation shaft 7 as in the conventional example, the following problems may occur.

(a) Since the cross-sectional area of the air gap is small, magnetic resistance rises, and the field current required for the rotor field may become large.

(b) An electromagnetic attraction force is generated in the axial direction, and a large axial force may be exerted to the bearings (not shown) for holding the starting device 4.

(c) In the cross section, the effective magnetic path width of the second air gap 12 is nearly equal to the thickness of the field core 6 and the thickness of the magnetic pole. What's more, when the field core 6 is excited, an electromotive force is exerted between the field core 6 and the rotor 1, and the electromotive force entirely acts as an axial force.

On the other hand, in this embodiment, since the second air gap 12 has the inclined section 122, the effective magnetic path width of the second air gap 12 can be increased in comparison with the conventional example. Furthermore, since the electromagnetic attraction force is dispersed not only to an axial force but also to a radial force, the axial force in this embodiment can be reduced in comparison with the conventional example. In other words, the electromagnetic attraction force in the axial direction is reduced, whereby the axial force exerted to the bearings can be reduced. Consequently, the drag torque of the rotary electric machine is reduced, whereby vehicle fuel consumption can be improved.

Furthermore, in this embodiment, since the second air gap 12 has the inclined section 122, the cross-sectional area of the second air gap 12 can be increased, whereby the magnetic resistance can be lowered and the field current can be reduced. Consequently, the efficiency of the rotary electric machine 10 is improved and vehicle fuel consumption can be further improved.

(3) In this embodiment, since the air gap 12B of the second air gap 12 has the inclined section 122, the radially outside portion 210 of the portion on the field core 6 side of the rotor 1 has a beak shape in a vertical cross section protruding toward the field core 6, and the portion on the rotor 1 side of the field core 6 has such a convex shape in a vertical cross section so as to get into the beak of the rotor 1. Hence, even if the radially outside portion 210 on the field core 6 side of the rotor 1 expands to the outside in the radial direction due to the centrifugal force generated by rotation, the radially outside portion 210 does not make contact with the field core 6. In other words, the portion on the field core 6 side of the rotor 1 can be prevented from being expanded in diameter by a centrifugal force and from interfering with the field core 6.

Second Embodiment

Figure 9:
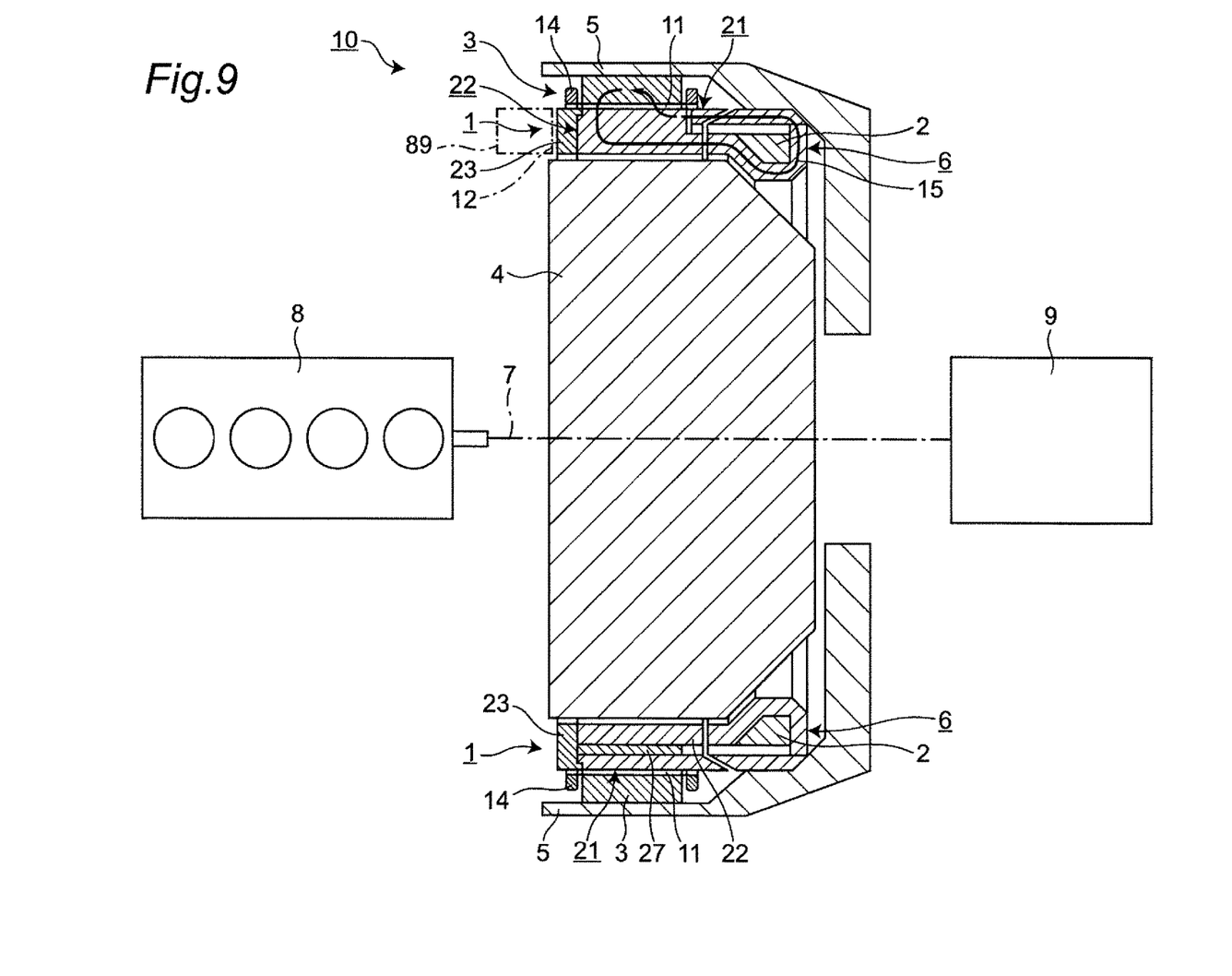
FIG. 9 is a view showing a vertical cross section of a rotary electric machine according to a second embodiment of the present invention and also showing the arrangement relationship among the rotary electric machine, an engine and a transmission.
Figure 10:
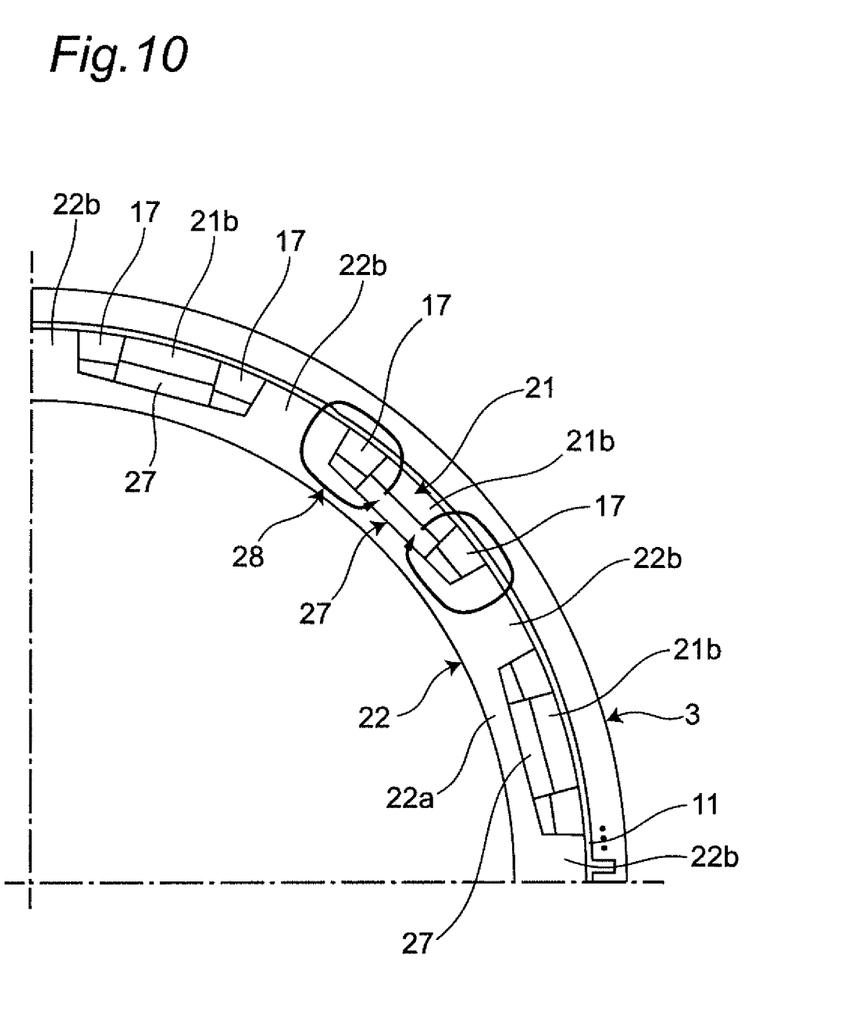
FIG. 10 is a partial front view showing the rotary electric machine according to the second embodiment.
Figure 11:
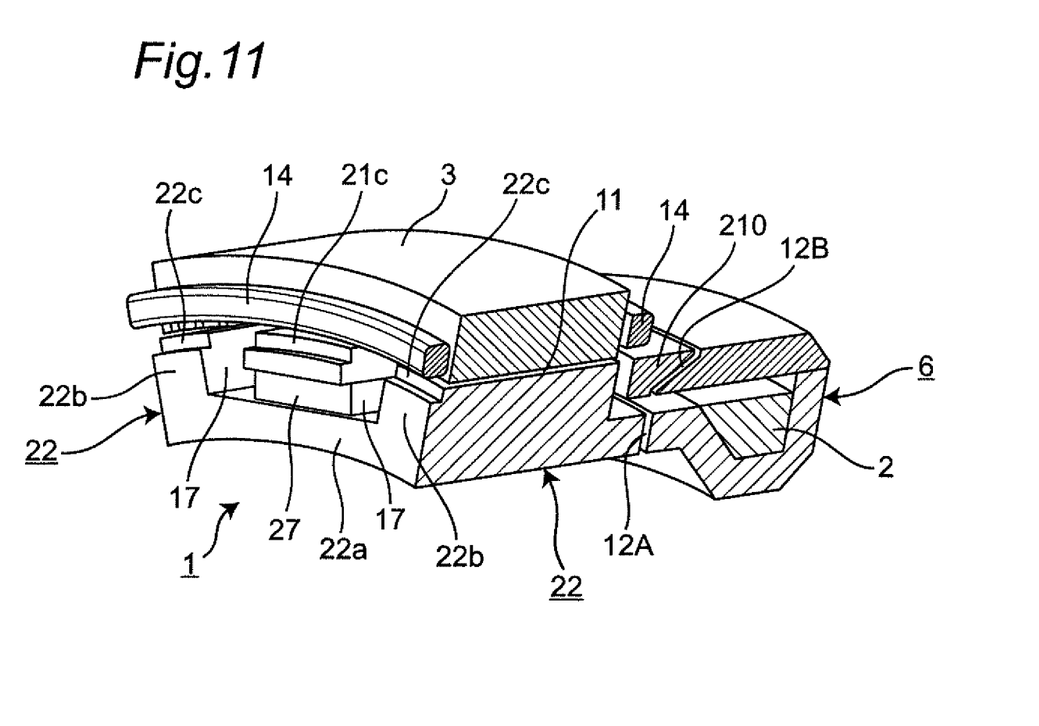
FIG. 11 is a vertically sectional perspective partial view showing the rotary electric machine according to the second embodiment, a magnetic pole holding member being not shown.

As shown in FIGS. 9 to 11, in this embodiment, permanent magnets 27 are disposed inside the rotor 1 in the configuration according to the first embodiment.

More specifically, the permanent magnets 27 having, for example, a rectangular plate shape, are provided at the same circumferential positions as those of the respective pawl sections 21*b* of the first magnetic pole 21 and on the inner diameter sides of the respective pawl sections 21*b* of the first magnetic pole 21 and on the outer diameter side of the second annular section 22*a* of the second magnetic pole 22 so as to be held between the inner peripheral faces of the respective pawl sections 21*b* and the outer peripheral face of the second annular section 22*a*. With this disposition, as shown in FIG. 10, the magnetic flux 28 of the permanent magnet 27 is formed between each pawl section 21*b* of the first magnetic pole 21 and each convex section 22*b* of the second magnet pole 22.

The permanent magnet 27 is a magnet mainly made from neodymium or a magnet mainly made from ferrite. More specifically, various kinds of permanent magnets, such as SmCo magnets, AlNiCo magnets or neodymium bonded magnets, can be used as the permanent magnets 27. Each permanent magnet 27 is disposed on the whole inner face of each pawl section 21*b* or part thereof.

With this configuration, the magnetic flux 28 of the permanent magnet 27 can be used in addition to the magnetic flux generated in the rotor 1 by the field coil 2, whereby the output performance of the rotary electric machine can be improved. Furthermore, since the permanent magnets 27 are pressed and held with the pawl sections 21*b*, the strength of the permanent magnets 27 against a centrifugal force can be reinforced, and the deformation of the permanent magnets 27 due to the centrifugal force can be prevented, whereby the centrifugal strength at high speed rotation can be improved.

Modification (a) The air gap 12B may merely have the inclined section 122 and may not be required to have one or both of the first vertical section 121 and the second vertical section 123.

(b) The air gap 12A may be formed so as to be inclined with respect to the axial direction of the rotation shaft 7. The direction of the inclination is preferably a direction along which the inclination is formed from the side of the engine 8 to the side of the transmission 9 as the inclination extends from the inside to the outside in the radial direction. With this configuration, even if the radially inside portion of the rotor 1 expands to the outside in the radial direction due to the centrifugal force generated by rotation, the radially inside portion does not make contact with the field core 6. The direction of the inclination may be a direction along which the inclination is formed from the side of the transmission 9 to the side of the engine 8 as the inclination extends from the inside to the outside in the radial direction.

(c) The rotary electric machine 10 may be disposed around the outer periphery of a rotary member other than the starting device 4. Examples of the other rotary members include a flywheel and a drive plate in a driving system.

By an appropriate combination of embodiments or modifications arbitrarily selected from the above-mentioned various embodiments or modifications, the respective effects of the embodiments or the modifications can be exerted. Furthermore, a combination of embodiments, a combination of working examples, or a combination of an embodiment and a working example is possible. Moreover, a combination of features of different embodiments or different working examples is also possible.

INDUSTRIAL APPLICABILITY

The present invention is useful as a rotary electric machine for wide and general use in driving and power generating apparatuses, thereby having a high industrial applicability.

DESCRIPTION OF REFERENCE NUMERALS

1: rotor
2: field coil
3: stator
4: starting device (rotation member)
5: stationary case
6: field core
7: rotation shaft
8: engine
9: transmission
10: rotary electric machine
11: first air gap
12: second air gap
122: inclined section
14: AC coil
21: first magnetic pole
21*a*: first annular section
21*b*: pawl section
21*c*: first tip end engagement section
210: (radially outer) portion
22: second magnetic pole
22*a*: second annular section
22*b*: convex section
22*c*: second tip end engagement section
22*d*: fitting section
23: magnetic pole holding member
23*a*: fitting section
27: permanent magnet

What is claimed is:

1. A brushless winding field type rotary electric machine positioned between a rotary member and a stationary case, comprising:
    a stator held in the stationary case and internally equipped with an AC coil for generating a rotating magnetic field by an AC current;
    a field core held in the stationary case and internally equipped with a field coil excited by a DC current;
    a rotor disposed around an outer periphery of the rotary member and held so as to be rotatable with respect to the stator and the field coil;
    a first air gap formed between the stator and the rotor, the first air gap being configured to deliver a magnetic flux between the stator and the rotor; and
    a second air gap formed between the field core and the rotor, the second air gap being configured to deliver a magnetic flux between the field coil and the rotor, wherein the field coil of the field core is disposed in parallel with the rotor in an axial direction of a rotation shaft of the rotary member via the second air gap, the second air gap has an inclined section inclined with respect to the axial direction of the rotation shaft between the field core and at least a radially outside portion of a portion on a field core side of the rotor so that the radially outside portion of the rotor is positioned on a radially outer side of the field core, and the first air gap and the second air gap are disposed without overlapping each other as viewed along a radial direction.

2. The rotary electric machine according to claim 1, wherein the radially outside portion of the portion on the field core side of the rotor has a beak shape in a vertical cross section protruding toward the field core, and the portion on the rotor side of the field core has such a convex shape in a vertical cross section so as to get into the beak of the rotor.

3. The rotary electric machine according to claim 1, wherein the second air gap is equipped with the inclined section and a vertical section formed so as to continue to the inclined section and to be perpendicular to the rotation shaft.

4. A brushless winding field type rotary electric machine, positioned between a rotary member and a stationary case, comprising:

a stator held in the stationary case and internally equipped with an AC coil for generating a rotating magnetic field by an AC current;

a field core held in the stationary case and internally equipped with a field coil excited by a DC current;

a rotor disposed around an outer periphery of the rotary member and held so as to be rotatable with respect to the stator and the field coil;

a first air gap formed between the stator and the rotor, the first air gap being configured to deliver a magnetic flux between the stator and the rotor; and a second air gap formed between the field core and the rotor, the second air gap being configured to deliver a magnetic flux between the field coil and the rotor, wherein the field coil of the field core is disposed in parallel with the rotor in an axial direction of a rotation shaft of the rotary member via the second air gap, the second air gap has an inclined section inclined with respect to the axial direction of the rotation shaft between the field core and at least a radially outside portion of a portion on a field core side of the rotor so that the radially outside portion of the rotor is positioned on a radially outer side of the field core, and an inclination angle of the inclined section of the second air gap is in a range of 10 to 25 degrees with respect to the axial direction of the rotation shaft.

5. A brushless winding field type rotary electric machine, positioned between a rotary member and a stationary case, comprising:

a stator held in the stationary case and internally equipped with an AC coil for generating a rotating magnetic field by an AC current;

a field core held in the stationary case and internally equipped with a field coil excited by a DC current;

a rotor disposed around an outer periphery of the rotary member and held so as to be rotatable with respect to the stator and the field coil;

a first air gap formed between the stator and the rotor, the first air gap being configured to deliver a magnetic flux between the stator and the rotor; and a second air gap formed between the field core and the rotor, the second air gap being configured to deliver a magnetic flux between the field coil and the rotor, wherein the field coil of the field core is disposed in parallel with the rotor in an axial direction of a rotation shaft of the rotary member via the second air gap, the second air gap has an inclined section inclined with respect to the axial direction of the rotation shaft between the field core and at least a radially outside portion of a portion on a field core side of the rotor so that the radially outside portion of the rotor is positioned on a radially outer side of the field core, and the rotor includes a first magnetic pole having a plurality of pawl sections protruding from a first annular section in the axial direction of the rotation shaft, a second magnetic pole being disposed so that a radial clearance is provided on an inside of the first annular section and having a plurality of convex sections, the convex sections radially protruding and being disposed while having circumferential clearances in a circumferential direction on an outer peripheral face of a second annular section that is disposed so as to be partially overlapped with the first annular section, and an annular magnetic pole holding member having a fitting section into which the pawl sections of the first magnetic pole and the convex sections of the second magnet pole are fitted and fixed, and the pawl sections of the first magnetic pole are inserted into the clearances between the convex sections of the second magnet pole such that the pawl sections of the first magnetic pole and the convex sections of the second magnet pole are disposed alternately in the circumferential direction, whereby the first magnetic pole and the second magnet pole are fitted and fixed to the magnetic pole holding member without making contact with each other.

6. The rotary electric machine according to claim 5, wherein the first tip end engagement sections of the pawl sections of the first magnetic pole are fitted into the fitting section disposed on an outer peripheral side of the magnetic pole holding member, so as to be fixed in the radial direction, and the second tip end engagement sections of the second magnet pole are fitted into the fitting section of the magnetic pole holding member, so as to be fixed in the radial direction.

7. The rotary electric machine according to claim 5, wherein the magnetic pole holding member is made from a non-magnetic material.

8. The rotary electric machine according to claim 5, wherein each of the first magnetic pole and the second magnet pole is made from a soft magnetic material.

9. The rotary electric machine according to claim 5, further comprising:

permanent magnets provided at same circumferential positions as those of the respective pawl sections of the first magnetic pole and on an inner diameter side of the first magnetic pole and on an outer diameter side of the second annular section of the second magnetic pole.

10. The rotary electric machine according to claim 9, wherein
the permanent magnets are mainly made from neodymium.

11. The rotary electric machine according to claim 9, wherein
the permanent magnets are mainly made from ferrite.

* * * * *